United States Patent
Cha et al.

(10) Patent No.: US 11,042,394 B2
(45) Date of Patent: Jun. 22, 2021

(54) METHOD FOR PROCESSING INPUT AND OUTPUT ON MULTI KERNEL SYSTEM AND APPARATUS FOR THE SAME

(71) Applicant: ELECTRONICS AND TELECOMMUNICATIONS RESEARCH INSTITUTE, Daejeon (KR)

(72) Inventors: Seung Jun Cha, Daejeon (KR); Jin Mee Kim, Daejeon (KR); Seung Hyub Jeon, Anyang (KR); Sung In Jung, Daejeon (KR); Yeon Jeong Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 127 days.

(21) Appl. No.: 16/159,342

(22) Filed: Oct. 12, 2018

(65) Prior Publication Data
US 2019/0114193 A1   Apr. 18, 2019

(30) Foreign Application Priority Data

Oct. 13, 2017   (KR) .................. 10-2017-0133467
Oct. 31, 2017   (KR) .................. 10-2017-0143784
Oct. 12, 2018   (KR) .................. 10-2018-0122065

(51) Int. Cl.
*G06F 9/455*   (2018.01)
*G06F 9/48*    (2006.01)
(Continued)

(52) U.S. Cl.
CPC ........ *G06F 9/45558* (2013.01); *G06F 9/3877* (2013.01); *G06F 9/4881* (2013.01);
(Continued)

(58) Field of Classification Search
CPC .................................................. G06F 9/45558
See application file for complete search history.

(56) References Cited

U.S. PATENT DOCUMENTS 7,181,757 B1   2/2007 Kim et al.
9,280,538 B2   3/2016 Lee et al.
(Continued)

FOREIGN PATENT DOCUMENTS

KR   10-1517258 B1   5/2015
KR   10-1614865 B1   4/2016
(Continued)

*Primary Examiner* — Sisley N Kim

(57) ABSTRACT

Disclosed is an apparatus and method of processing input and output in a multi-kernel system. A method of processing input and output in a multi-kernel system according to the present disclosure includes: setting a shared memory between a first kernel on a main processor and a lightweight kernel on a parallel processor; setting a data transmission and reception channel between the first kernel on the main processor and the lightweight kernel on the parallel processor using the shared memory; providing, on the basis of the data transmission and reception channel, an input/output task that occurs in the lightweight kernel to the first kernel on the main processor; processing, by the first kernel on the main processor, an operation corresponding to the input/output task; and providing a result of the processing to the lightweight kernel.

11 Claims, 13 Drawing Sheets

(51) Int. Cl.
*G06F 9/38* (2018.01)
*G06F 9/54* (2006.01)
*G06F 15/163* (2006.01)
*G06F 12/1072* (2016.01)

(52) U.S. Cl.
CPC .............. *G06F 9/544* (2013.01); *G06F 9/545* (2013.01); *G06F 15/163* (2013.01); *G06F 12/1072* (2013.01); *G06F 2009/45583* (2013.01); *G06F 2212/1016* (2013.01); *G06F 2212/656* (2013.01); *G06F 2212/657* (2013.01)

(56) References Cited

U.S. PATENT DOCUMENTS

| | | | |
|---|---|---|---|
| 2013/0263121 A1* | 10/2013 | Franke | G06F 9/45537 718/1 |
| 2013/0263157 A1* | 10/2013 | Inglett | G06F 9/545 719/319 |
| 2016/0328348 A1* | 11/2016 | Iba | G06F 13/4022 |
| 2016/0378534 A1 | 12/2016 | Oh et al. | |
| 2016/0378535 A1 | 12/2016 | Oh et al. | |
| 2016/0378680 A1 | 12/2016 | Sha et al. | |
| 2017/0203436 A1* | 7/2017 | Wei | G06F 9/4887 |

FOREIGN PATENT DOCUMENTS

| | | |
|---|---|---|
| KR | 10-2016-0123370 A | 10/2016 |
| WO | 2009043043 A1 | 4/2009 |
| WO | 2011011769 A1 | 1/2011 |

\* cited by examiner

METHOD FOR PROCESSING INPUT AND OUTPUT ON MULTI KERNEL SYSTEM AND APPARATUS FOR THE SAME

CROSS REFERENCE TO RELATED APPLICATION

The present application claims priority to Korean Patent Application No. 10-2017-0133467, filed Oct. 13, 2017, Korean Patent Application No. 10-2017-0143784, filed Oct. 31, 2017, and Korean Patent Application No. 10-2018-0122065, filed Oct. 12, 2018, the entire contents of which are incorporated herein for all purposes by this reference.

BACKGROUND OF THE INVENTION

Field of the Invention

The present disclosure relates generally to a computing device. More particularly, the present disclosure relates to memory access management in a manycore system.

Description of the Related Art

System performance and power requirements are becoming increasingly demanding in computer systems and devices, particularly in portable computing devices (PCDs), such as cellular telephones, personal digital assistants (PDAs), portable game consoles, palmtop computers, tablet computers, and other portable electronic devices. Such devices may include multiple processing units optimized for a specific purpose. For example, one or more central processing units (CPUs) may be used for general system level performance or other purposes, while a graphic processing unit (GPU) may be specifically designed for manipulating computer graphics for output to a display device. As each processor requires more performance, there is a need for faster and more specialized memory devices designed to enable the particular purpose(s) of each processor to be achieved.

Memory architectures are typically optimized for a specific application. CPUs may require high density memory with an acceptable system level performance, while GPUs may require relatively low density memory with a substantially higher performance than CPUs.

Examples of a main processor and a parallel processor include a Xeon processor and a Xeon Phi processor. A lightweight kernel is a kernel consisting of a minimum of software stacks to quickly execute a computation-oriented application program, and Xeon Phi may run the lightweight kernel to enhance parallel processing through many cores. The lightweight kernel running on Xeon Phi does not include the software stack for processing file input/output in order to minimize operating system's interference. However, a high-speed file input/output function is required to enhance the performance of application program that requires file input/output.

There are conventional techniques, such as NAS or Lustre, to process file input/output in parallel in high performance computing. However, this is supported only by Linux so that it is difficult to apply the conventional techniques to the lightweight kernel. Also, when software, such as NAS and Lustre, is installed, interference occurs in executing the application program due to computing overhead of the process, which results in performance degradation. Furthermore, an environment added for installation may cause another interference, which results in performance degradation.

For high performance (extreme-scale) computing in manycore environment, it is required to develop a new kernel according to new hardware rather than to improve a conventional operating system.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a method and apparatus for processing input and output generated in a lightweight kernel by taking into consideration physical resource characteristics in manycore environment.

Furthermore, the present disclosure is intended to propose a method and apparatus for offloading file input/output onto a kernel for a parallel processor and for performing high-speed file input/output on the basis of dynamic memory access (DMA).

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of processing input and output in a multi-kernel system including: setting a shared memory between a first kernel on a main processor and a lightweight kernel on a parallel processor; setting a data transmission and reception channel between the first kernel on the main processor and the lightweight kernel on the parallel processor using the shared memory; providing, on the basis of the data transmission and reception channel, an input/output task that occurs in the lightweight kernel to the first kernel on the main processor; processing, by the first kernel on the main processor, an operation corresponding to the input/output task; and providing a result of the processing to the lightweight kernel.

In the method of processing input and output in a multi-kernel system according to the present disclosure, the setting of the shared memory comprises setting the shared memory between the first kernel on the main processor and a second kernel on the parallel processor.

In the method of processing input and output in a multi-kernel system according to the present disclosure, the setting of the shared memory comprises checking, by the second kernel on the parallel processor, a physical address of the shared memory; providing, by the second kernel on the parallel processor, the physical address of the shared memory to the lightweight kernel; and setting, by the lightweight kernel, a virtual address corresponding to the physical address.

In the method of processing input and output in a multi-kernel system according to the present disclosure, the setting of the data transmission and reception channel comprises: setting, by the lightweight kernel on the parallel processor and the first kernel on the main processor, an input/output request queue in the shared memory; and setting, by the lightweight kernel on the parallel processor and the first kernel on the main processor, an input/output response queue in the shared memory.

In the method of processing input and output in a multi-kernel system according to the present disclosure, the providing of the input/output task that occurs in the lightweight kernel to the first kernel comprises loading parameters related to the input/output task into the input/output request queue.

In the method of processing input and output in a multi-kernel system according to the present disclosure, the providing of the result of the processing to the lightweight kernel comprises loading data corresponding to the result of the processing into the input/output response queue.

In the method of processing input and output in a multi-kernel system according to the present disclosure, the parameters related to the input/output task comprises at least one among a file identifier, a file type, a file path, and a file descriptor.

In the method of processing input and output in a multi-kernel system according to the present disclosure, the first kernel on the main processor and a second kernel on the parallel processor are the same kernel.

In the method of processing input and output in a multi-kernel system according to the present disclosure, the input/output request queue and the input/output response queue are set using information that a physical address of the shared memory is mapped to a virtual address.

In the method of processing input and output in a multi-kernel system according to the present disclosure, the loading of the parameters related to the input/output task into the input/output request queue comprises checking a virtual address corresponding to the input/output request queue; and loading the parameters related to the input/output task into the virtual address corresponding to the input/output request queue.

In the method of processing input and output in a multi-kernel system according to the present disclosure, the loading of the data corresponding to the result of the processing into the input/output response queue comprises checking a virtual address corresponding to the input/output response queue; and loading the data corresponding to the result of the processing into the virtual address corresponding to the input/output response queue.

In the method of processing input and output in a multi-kernel system according to the present disclosure, the providing of the result of the processing to the lightweight kernel further comprises checking, by the lightweight kernel, the data corresponding to the result of the processing, which is loaded into the input/output response queue.

Also, according to another aspect of the present disclosure, there is provided a method of processing input and output in a multi-kernel system including: setting a shared memory between a first kernel on a parallel processor and a lightweight kernel on the parallel processor; setting a data transmission and reception channel between the first kernel on the parallel processor and the lightweight kernel on the parallel processor using the shared memory;

providing, by the lightweight kernel on the basis of the data transmission and reception channel, an input/output task that occurs in the lightweight kernel to the first kernel on the parallel processor; providing, by the first kernel on the parallel processor, the input/output task to a second kernel on a main processor; and processing, by the second kernel on the main processor, an operation corresponding to the input/output task, wherein the processing includes providing, by the second kernel on the main processor, data corresponding to the input/output task to the lightweight kernel on the basis of a dynamic memory access (DMA) scheme.

In the method of processing input and output in a multi-kernel system according to the present disclosure, the processing further comprises transmitting, by the second kernel on the main processor, a result of the processing of the input/output task to the first kernel on the parallel processor; and transmitting, by the first kernel on the parallel processor, the result of the processing of the input/output task to the lightweight kernel.

In the method of processing input and output in a multi-kernel system according to the present disclosure, the setting of the data transmission and reception channel comprises setting, in the shared memory by the lightweight kernel on the parallel processor and the first kernel on the parallel processor, at least one among a queue for requesting the input/output task and a queue for responding to a result of the processing of the input/output task.

In the method of processing input and output in a multi-kernel system according to the present disclosure, the channel is a circular queue-based channel.

Also, according to another aspect of the present disclosure, there is provided a multi-kernel system including: a first kernel on a parallel processor; a lightweight kernel on the parallel processor, the lightweight kernel setting a shared memory with the first kernel on the parallel processor and setting a data transmission and reception channel to the first kernel on the parallel processor using the shared memory; and a second kernel on a main processor, the second kernel receiving an input/output task from the first kernel on the parallel processor and processing an operation corresponding to the received input/output task, wherein the second kernel on the main processor provides data corresponding to the input/output task to the lightweight kernel on the basis of a dynamic memory access (DMA) scheme.

In the multi-kernel system according to the present disclosure, the second kernel on the main processor transmits a result of the processing of the input/output task to the first kernel on the parallel processor, and the first kernel on the parallel processor transmits the result of the processing of the input/output task to the lightweight kernel.

In the multi-kernel system according to the present disclosure, the lightweight kernel on the parallel processor and the first kernel on the parallel processor set, in the shared memory, at least one among a queue for requesting the input/output task and a queue for responding to a result of the processing of the input/output task.

Also, according to another aspect of the present disclosure, there is provided a computing device comprising a computer-readable recording medium having a program recorded thereon, the program being configured to execute an operation of processing input and output in a multi-kernel system including: setting a shared memory between a first kernel on a main processor and a lightweight kernel on a parallel processor; setting a data transmission and reception channel between the first kernel on the main processor and the lightweight kernel on the parallel processor using the shared memory; providing, on the basis of the data transmission and reception channel, an input/output task that occurs in the lightweight kernel to the first kernel on the main processor; processing, by the first kernel on the main processor, an operation corresponding to the input/output task; and providing a result of the processing to the lightweight kernel.

According to the present disclosure, a method and apparatus for efficiently processing input and output that occur in the lightweight kernel may be provided.

Furthermore, according to the present disclosure, a method and apparatus for offloading file input/output onto a kernel on a parallel processor and for performing high-speed file input/output on the basis of dynamic memory access (DMA).

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
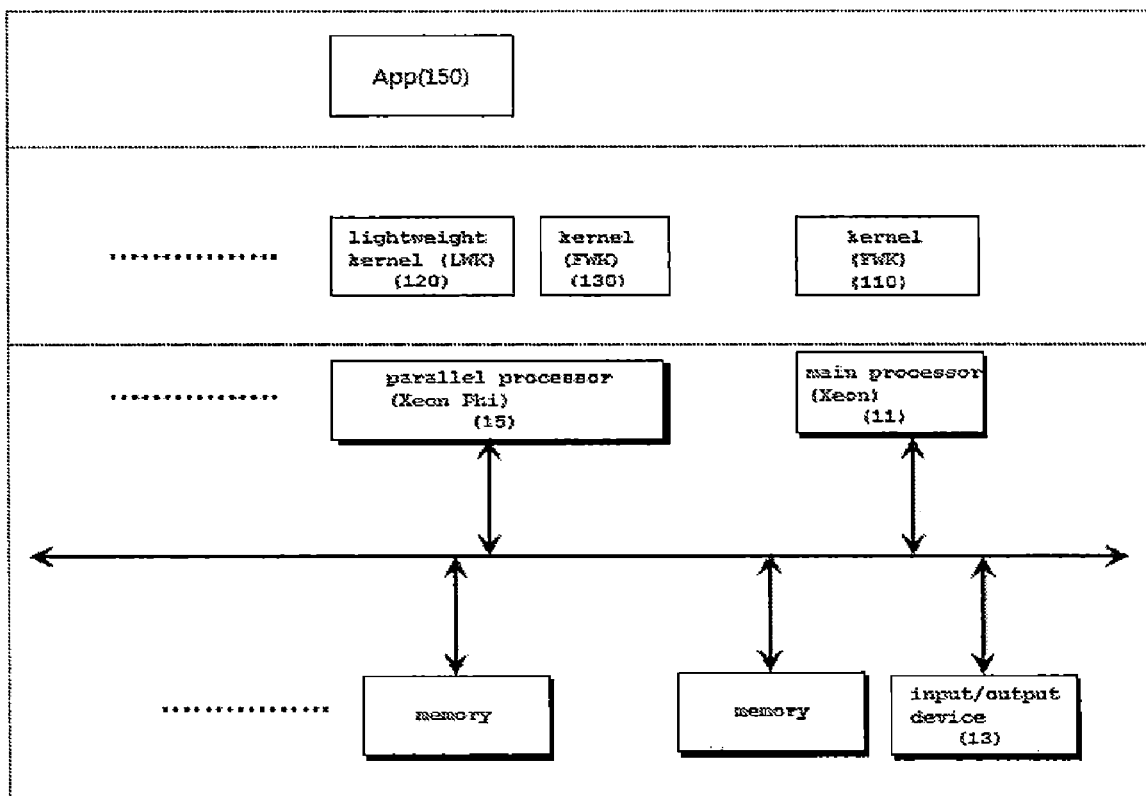
FIG. 1 is a diagram illustrating configuration of a device to which a method of processing file input and output is applied according to an embodiment of the present disclosure.

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Hereinbelow, exemplary embodiments of the present disclosure will be described in detail with reference to the accompanying drawings. Throughout the drawings, the same reference numerals will refer to the same or like parts.

FIG. 1 is a diagram illustrating configuration of a device to which a method of processing file input and output is applied according to an embodiment of the present disclosure.

Referring to FIG. 1, the device to which a method of processing file input and output is applied may include a main processor 11 and a parallel processor 15. The main processor 11 and the parallel processor 15 may include one or more processors disposed within separate components, or alternatively may include one or more processing cores implemented within a single component (for example, system on chip (SoC) configuration) and arbitrary processor-related support circuit (for example, a bridge interface, and the like). Examples of the processors include, but are not limited to, various x86-based microprocessors available from the Intel Corporation including those in the Pentium, Xeon, Itanium, Celeron, Atom, Core i-series, Quark product families, Advanced RISC (reduced instruction set computing) machine, or ARM processors.

The main processor 11 may be connected to an input/output device 13, and may be equipped with a kernel (FWK, full weight kernel) 110. The kernel 110 may control memory read/write, task execution, and data transmission and reception with the input/output device 13 (for example, a display, a keyboard, a mouse, a network device, and the like). The kernel (FWK) 110 may be a Linux operating system. Hereinafter, in the embodiment of the present disclosure, the kernel (FWK) 110 on the main processor 11 is a Linux-based kernel, but the present disclosure is not limited thereto and various types of kernels (FWK) may be used.

The parallel processor 15 may include a lightweight kernel (LWK) 120 to process required task, and the like. The lightweight kernel 120 may include a minimum of software stacks to quickly execute a computation-oriented application program 150. The lightweight kernel 120 does not include a software stack for processing input/output in order to minimize interference of the operating system or between kernels. Therefore, the lightweight kernel 120 may not access the input/output device 13 when processing a task requested in the application program 150 that requires file input/output. By taking this into consideration, the parallel processor 15 may access the input/output device 13 in cooperation with the main processor 11, and may process the relevant task.

Specifically, the parallel processor 15 may be equipped with a kernel (FWK, full weight kernel) 130. The kernel 130 may serve as a kernel capable of cooperating with the kernel 110 on the main processor 11. For example, like the kernel 110 on the main processor 11, the kernel 130 may include a Linux-based kernel. Furthermore, the kernel 110 on the main processor 11 may be connected with the kernel on the parallel processor 15 by setting a symmetric communications interface (SCIF).

In this environment, when processing of the input/output task is required in the operation environment of the lightweight kernel 120 on the parallel processor 15, the kernel 110 on the main processor 11 is requested to process the input/output task and the result is received, whereby the input /output task processing is completed.

For example, the main processor 11 and the parallel processor 15 may perform input/output task processing using a shared memory. That is, the shared memory is set between the main processor 11 and the parallel processor 15, and the request and result of the input/output task are read/written via the shared memory, thereby processing the input/output task.

To this end, the kernel 110 on the main processor 11 and the kernel 130 on the parallel processor 15 may perform an operation of setting the shared memory. Then, the kernel 130 on the parallel processor 15 may extract the physical address of the set shared memory, and may provide the extracted physical address of the shared memory to the lightweight kernel 120. The lightweight kernel 120 may map the physical address of the shared memory to a predetermined virtual address for management. Furthermore, when the input/output task occurs among tasks of the application program 150, the lightweight kernel 120 processes input/output task the using the virtual address of the shared memory.

With the shared memory in this structure, a data transmission channel for the input/output task is established between the lightweight kernel 120 on the parallel processor 15 and the kernel 110 on the main processor 11, and offload processing environment for input/output task processing is established.

Accordingly, the lightweight kernel 120 does not need to establish additional software stack for the input/output task, and may minimize interference in the lightweight kernel 120 during input/output task processing.

Figure 2:
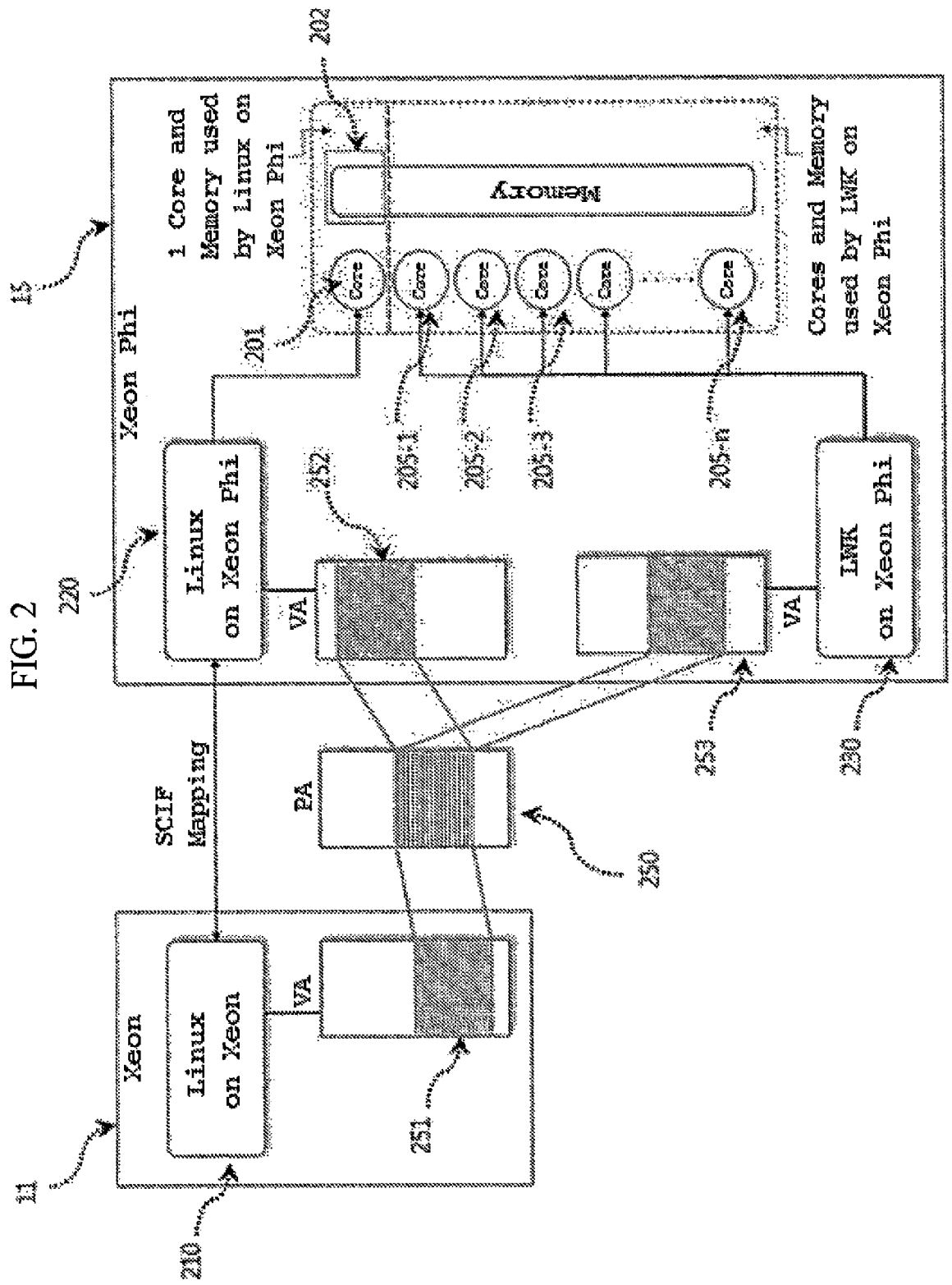
FIG. 2 is a diagram illustrating an operation of setting a shared memory by the device shown in FIG. 1.

FIG. 2 is a diagram illustrating an operation of setting the shared memory by the device shown in FIG. 1.

Hereinafter, the operation of setting the shared memory between the main processor 11 and the parallel processor 15 will be described in detail with reference to FIG. 2.

In the embodiment of the present disclosure, the main processor 11 illustrates the Xeon processor and the parallel processor 15 illustrates the Xeon Phi processor.

First, the main processor 11 (for example, the Xeon processor) may be equipped with a kernel 210 (for example, Linux). The parallel processor 15 may be equipped with a kernel (for example, Linux) 220 using at least one core 201 and a predetermined area 202 of a memory. Furthermore, the parallel processor 15 may be equipped with a lightweight kernel 230 using the core 205-1, . . . , and 205-$n$ excluding the at least one core 201 on which Linux is installed among the cores provided inside and using areas 205 of the memory excluding the predetermined area 202 of the memory on which Linux is installed.

Next, the shared memory may be set using the SCIF between the kernel 210 on the main processor 11 and the kernel 220 on the parallel processor 15. That is, a physical address 250 to be used as the shared memory between the kernel 210 on the main processor 11 and the kernel 220 on the parallel processor 15 may be set, and the kernel 220 on the parallel processor 15 may store the physical address 250 used as the shared memory. The lightweight kernel 230 on the parallel processor 15 may check the physical address 250 of the shared memory stored in the kernel 220 on the parallel processor 15, and may map the physical address to a virtual address 253 used by the lightweight kernel 230. Accordingly, the lightweight kernel 230 may operate the shared memory with the kernel 210 on the main processor 11.

Figure 3:
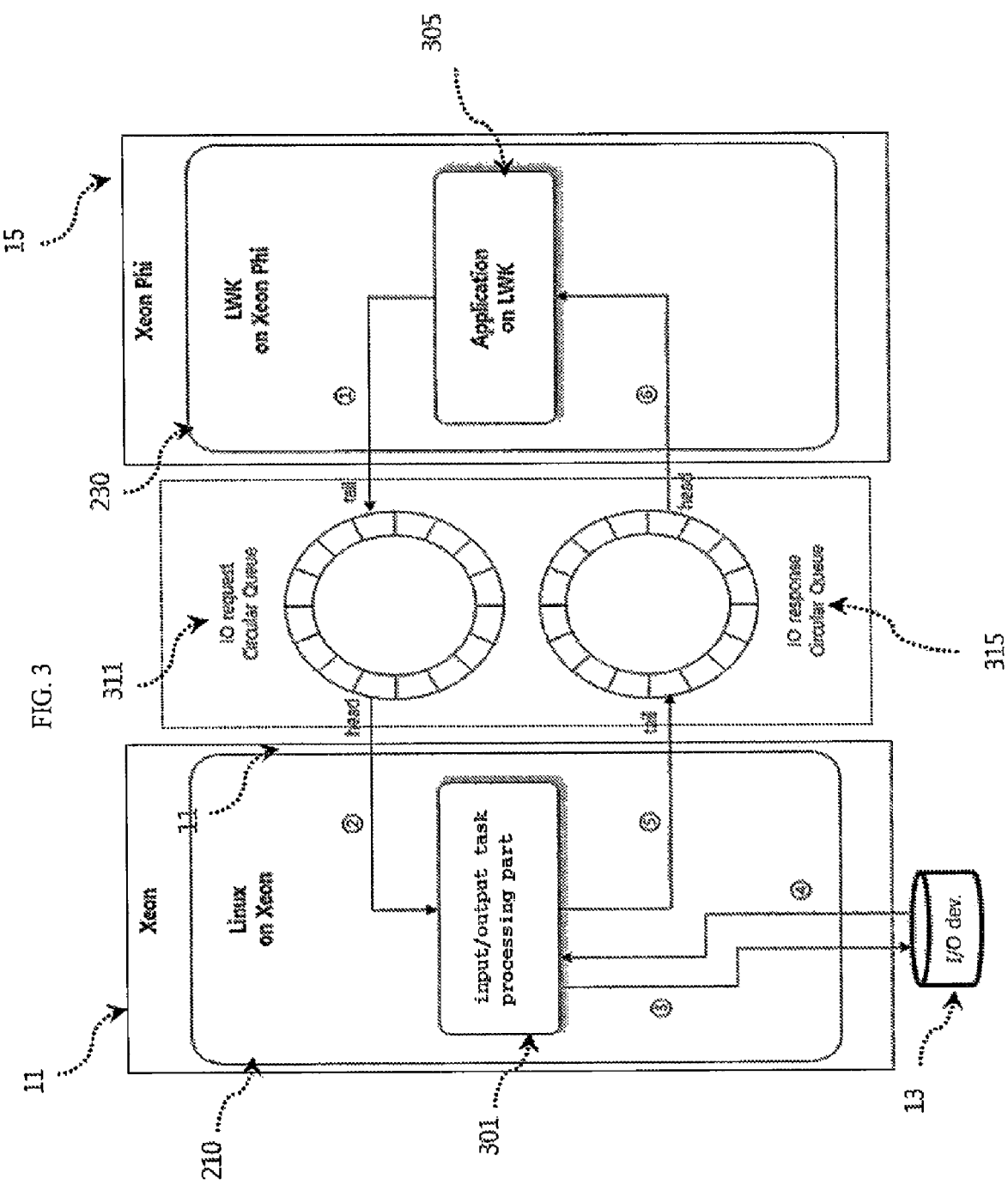
FIG. 3 is a diagram illustrating an example of an operation of processing an input/output task using a shared memory by the device shown in FIG. 1.

FIG. 3 is a diagram illustrating an example of an operation of processing an input/output task using a shared memory by the device shown in FIG. 1.

The kernel 210 on the main processor 11 may include an input/output task processing part 301 processing an input/output task. The input/output task processing part 301 is connected to the input/output device 13, checks the input/output task which occurs inside the kernel 210 or the input/output task which occurs in an application program (not shown) outside the kernel 210, and access the corresponding input/output device to perform processing of the input/output task.

In the shared memory 310 set between the kernel 210 on the main processor 11 and the lightweight kernel 230 on the parallel processor, an area for processing of the input/output task may be set. Specifically, in the shared memory 310, there is provided a queue in which the lightweight kernel 230 requests the input/output task. For example, examples of the queue for requesting the input/output task may include an input/output request circular queue 311. Furthermore, in the shared memory 310, there is provided a queue in which the kernel 210 on the main processor 11 responds to the result of processing of the input/output task. For example, examples of the queue for responding to the result of processing of the input/output task may include an input/output response circular queue 315.

The kernel 210 on the main processor 11 and the lightweight kernel 230 on the parallel processor may respectively manage information that the physical address is mapped to the virtual address of the shared memory 310 in which the input/output request circular queue 311 and the input/output response circular queue 315 are set. In this environment, when the input/output task occurs in an application program 305 running on the lightweight kernel 230, parameters (for example, a file path, a file descriptor, a flag, a mode, an ID, a type, and the like) related to the input/output task (for example, open, read, write, close, and the like) are added to the input/output request circular queue 311.

The input/output task processing part 301 on standby in the kernel 210 on the main processor 11 may extract input/output commands in order from the input/output request circular queue 311. Then, the input/output task processing part 301 may provide the input/output commands to the input/output device 13, and the input/output device 13 may process the input/output commands. Accordingly, the input/output task processing part 301 receives the result of executing the input/output commands from the input/output device 13.

Furthermore, the input/output task processing part 301 adds the result of executing the input/output commands by the input/output device 13 to the input/output response circular queue 315. Then, the application program of the lightweight kernel 230 may extract the input/output results loaded in order in the input/output response circular queue 315.

In high performance computing, there is a technique of processing file input/output in parallel, but the technique is supported only in a specific kernel (for example, Linux, or the like) so that it is difficult to be applied in the lightweight kernel. Furthermore, if a separate program (for example, NAS, Lustre, or the like) for processing file input/output in parallel is installed, interference may occur in executing the application program due to computing overhead of the processor, which results in performance degradation.

According to the above-described embodiment of the present disclosure, file input/output may be processed in parallel in the specific kernel (for example, Linux, or the like) as well as in various operating systems. Furthermore, file input/output may be processing in parallel without a separate program for processing file input/output in parallel, so that parallel processing is realized quickly and stably without computing overhead of the processor or interference in application program processing.

Figure 4:
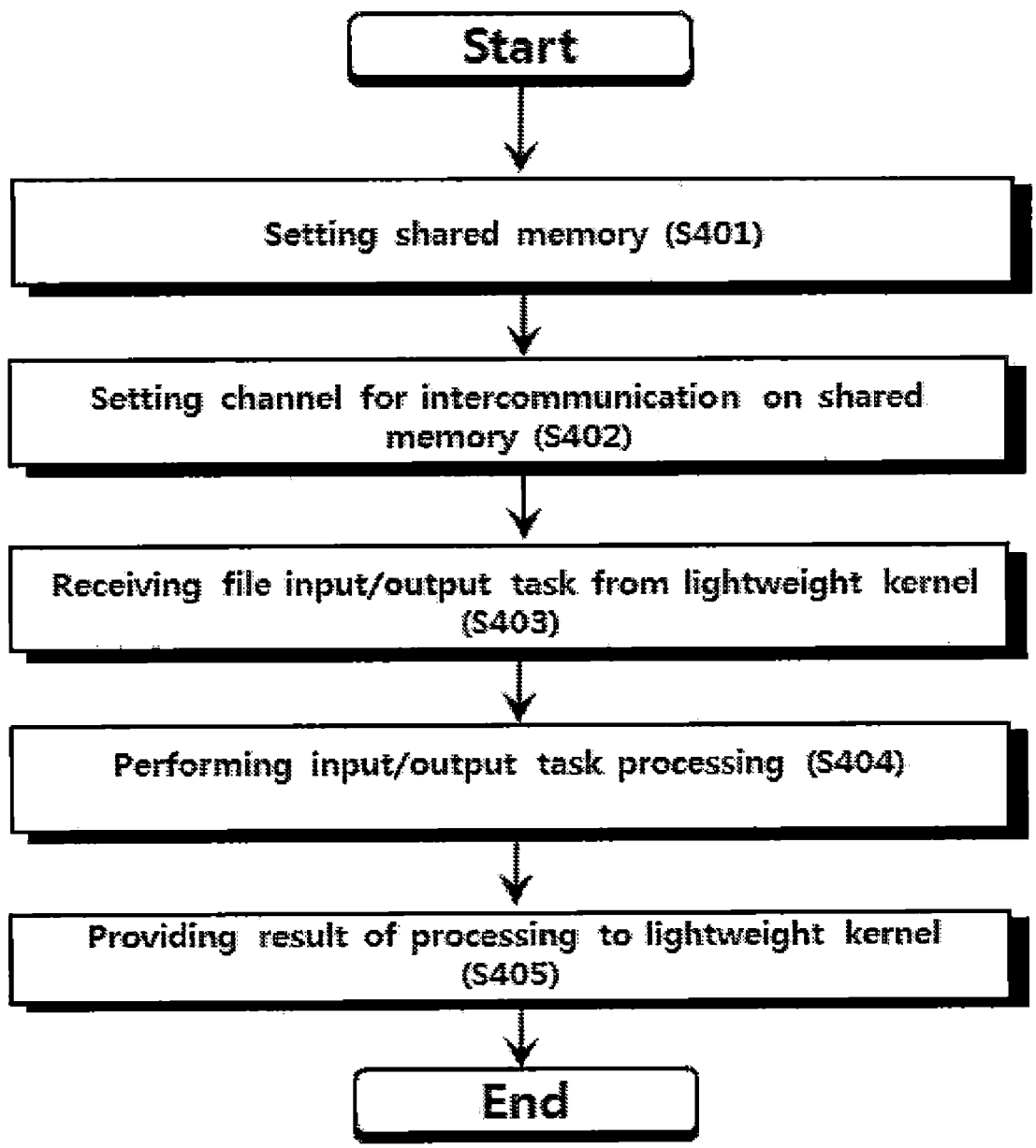
FIG. 4 is a flowchart illustrating a sequence of a method of processing file input and output according to an embodiment of the present disclosure.

FIG. 4 is a flowchart illustrating a sequence of a method of processing file input and output according to an embodiment of the present disclosure.

The method of processing file input and output shown in FIG. 4 illustrates that the main processor 11 shown in FIGS. 1 to 3 processes file input and output.

First, at step S401, the main processor 11 may set the shared memory with the parallel processor 15.

For example, the main processor 11 may be connected to the input/output device 13, and may be equipped with the kernel (FWK, full weight kernel) 110. The kernel 110 may control memory read/write, task execution, and data transmission and reception with the input/output device 13 (for example, a display, a keyboard, a mouse, a network device, and the like). In this environment, in order to offload file input/output from the lightweight kernel running on the parallel processor 15 onto the kernel on the main processor 11, the shared memory between the main processor 11 and the parallel processor 15 may be set. Here, in order to set the memory shared between the kernel 210 on the main processor 11 and the kernel 220 on the parallel processor 15, the symmetric communications interface (SCIF) included in Intel® Manycore Platform Software Stack (Intel® MPSS) may be used.

Here, the kernel 210 on the main processor 11 may check the physical address of the memory shared with the kernel 220 on the parallel processor 15, and may assign and store the virtual address corresponding to physical address. When accessing the shared memory, the virtual address is used for access.

In the meantime, the lightweight kernel 230 is unable to directly set the shared memory with the kernel 210 on the main processor 11 using the SCIF, so that the kernel 220 may be provided on some resources of the parallel processor 15. Furthermore, the kernel 220 provided on the parallel processor 15 may be utilized as a device driver that is used to access the kernel 210 on the main processor 11 and the shared memory.

As described above, when setting of the shared memory is completed, set is a channel for intercommunication on the SCIF shared memory between the kernel 210 on the main processor 11 and the lightweight kernel 230 on the parallel processor at step S402.

Specifically, in the shared memory set between the kernel 210 on the main processor 11 and the lightweight kernel 230 on the parallel processor, the area for processing of the input/output task may be set. Specifically, in the shared memory, the queue in which the lightweight kernel 230 requests the input/output task may be set. Furthermore, in the shared memory, the queue in which the kernel 210 on the main processor 11 responds to the result of processing of the input/output task may be set. For example, the queue in which the lightweight kernel 230 requests the input/output task may be provided on the basis of a circular queue. Furthermore, the queue in which the kernel 210 on the main processor 11 responds to the result of processing of the input/output task may be provided on the basis of the circular queue. Here, the queue for requesting the input/output task may be set on the basis of information that the physical address is mapped to the virtual address. Furthermore, the queue for responding to the result of processing of the input/output task may be set on the basis of the information that the physical address is mapped to the virtual address.

As described above, when the channel is set between the kernel 210 on the main processor 11 and the lightweight kernel 230 on the parallel processor, the kernel 210 on the main processor 11 receives the input/output task from the lightweight kernel 230 on the parallel processor through the set channel at step S403. For example, when the input/output task occurs, on the basis of information that the physical address is mapped to the virtual address, the lightweight kernel 230 loads data corresponding to the input/output task into the queue for requesting the input/output task. According to the loading, the kernel 210 on the main processor 11 may receive the data corresponding to the input/output task.

Accordingly, at step S404, the kernel 210 on the main processor 11 may perform processing of the input/output task. For example, the kernel 210 checks the input/output device 13 corresponding to input/output task, and requests the input/output device 13 to perform processing of the input/output task. Then, the kernel 210 receives the result of processing of the input/output task via the input/output device 13.

At step S405, the kernel 210 loads the received result into the queue for responding to the result of processing of the input/output task, so that the result of processing of the input/output task is provided to the lightweight kernel 230 on the parallel processor. For example, the kernel 210 may load the result of processing of the input/output task into the queue for responding to the result of processing of the input/output task on the basis of the information that the physical address is mapped to the virtual address. According to the loading, the lightweight kernel 230 may receive the result of processing of the input/output task.

Figure 5:
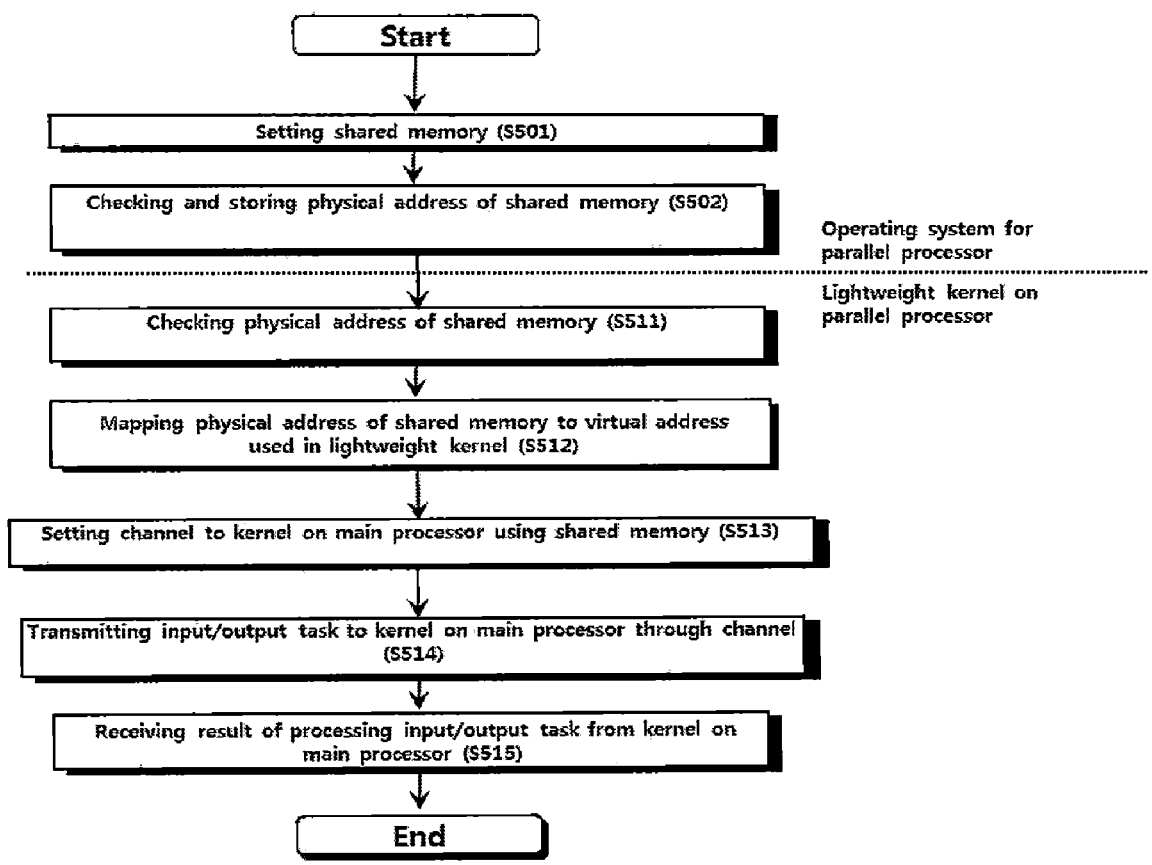
FIG. 5 is a flowchart illustrating a sequence of a method of processing file input and output according to another embodiment of the present disclosure.

FIG. 5 is a flowchart illustrating a sequence of a method of processing file input and output according to another embodiment of the present disclosure.

The method of processing file input and output shown in FIG. 5 illustrates that the parallel processor 15 shown in FIGS. 1 to 3 processes file input and output.

First, at step S501, the parallel processor 15 may set the shared memory with the main processor 11.

For example, the shared memory may be set using the SCIF between the kernel 210 on the main processor 11 and the kernel 220 on the parallel processor 15. That is, set is a physical address to be used as the shared memory between the kernel 210 on the main processor 11 and the kernel 220 on the parallel processor 15. The parallel processor 15 is unable to set the shared memory with the kernel 210 on the main processor 11 directly to the lightweight kernel 230, so that the kernel 220 is provided on some resources of the parallel processor 15. In order to access, by the kernel 220 provided on the parallel processor 15, the shared memory with the kernel 210 on the main processor 11, the memory shared between the kernel 210 on the main processor 11 and the kernel 220 on the parallel processor 15 may be set.

Next, at step S502, the kernel 220 on the parallel processor 15 may check the physical address of the memory shared with the kernel 210 on the main processor 11 and may store the physical address.

In the meantime, in order to use the physical address of the memory in the lightweight kernel 230, which is shared between the kernel 210 on the main processor 11 and the kernel 220 on the parallel processor 15, setting of the memory is required in the lightweight kernel 230. To this end, at step S511, the lightweight kernel 230 may check the physical address that is set and stored as the shared memory in the kernel 220 on the parallel processor 15. Next, at step S512, the lightweight kernel 230 may map the checked physical address of the shared memory to the virtual address used in the lightweight kernel 230.

In the meantime, as described above, when the virtual address mapping of the shared memory is completed in the lightweight kernel 230, the lightweight kernel 230 on the parallel processor sets the channel for intercommunicating with the kernel 210 on the main processor 11 on the SCIF shared memory at step S513.

Specifically, in the set shared memory between the kernel 210 on the main processor 11 and the lightweight kernel 230 on the parallel processor, the area for processing of the input/output task may be set. Specifically, in the shared memory, the queue in which the lightweight kernel 230 requests the input/output task may be set. Furthermore, in the shared memory, the queue in which the kernel 210 on the main processor 11 responds to the result of processing of the input/output task may be set. For example, the queue in which the lightweight kernel 230 requests the input/output task may be provided on the basis of a circular queue. Furthermore, the queue in which the kernel 210 on the main processor 11 responds to the result of processing of the input/output task may be provided on the basis of a circular queue. Moreover, the queue for requesting the input/output task illustrates the input/output request circular queue, and the queue for responding to the result of processing of the input/output task illustrates the input/output response circular queue.

As described above, when the channel is set between the lightweight kernel 230 on the parallel processor and the kernel 210 on the main processor 11, the lightweight kernel 230 on the parallel processor may request the kernel 210 on the main processor 11 for the input/output task through the set channel at step S514. For example, the lightweight kernel 230 checks the input/output task in the application program, and loads the parameters (for example, the file path, the file descriptor, the flag, the mode, the ID, the type, and the like) related to the input/output task (for example, open, read, write, close, and the like) into the input/output request circular queue 311 on the basis of the information that the physical address is mapped to the virtual address. In response to this, the kernel 210 on the main processor 11 may perform input/output task processing corresponding to a control signal, and may provide the result. Here, the kernel 210 on the main processor 11 may load the result of processing the input/output task into the input/output response circular queue on the basis of the information that the physical address is mapped to the virtual address. At step S515, the lightweight kernel 230 on the parallel processor may receive the result of processing the input/output task through the data loaded into the input/output response circular queue.

Hereinafter, described is a method of installing the kernel in some resources (for example, a core, a memory) of the parallel processor, of offloading file input/output onto the installed kernel, and of performing high-speed file input/output on the basis of dynamic memory access (DMA). According to the DMA-based high-speed file input/output method, it is unnecessary to establish an additional file system software stack for high-speed file input/output within the lightweight kernel, and interference in the lightweight kernel during file input/output processing may be minimized.

In the embodiment of the present disclosure, the main processor illustrates a Xeon processor, and the parallel processor illustrates a Xeon Phi processor.

In the apparatus and/or method of the present disclosure, in order to perform file input/output in the lightweight kernel on the parallel processor, a kernel is installed on the parallel processor and is utilized as the device driver. That is, a shared memory area is established for both the lightweight kernel on the parallel processor and the kernel on the parallel processor. By using the shared memory area, the lightweight kernel on the parallel processor may provide, to the kernel on the parallel processor, the file input/output command (or the input/output task) for offloading file input/output. The kernel on the parallel processor may convert the physical address of the lightweight kernel on the parallel processor, which is present within the received file input/output command, into the virtual address of the kernel on the parallel processor. The conversion causes a condition as if file input/output were performed on the memory belonging to the kernel on the parallel processor. When the converted file input/output command is executed in the kernel on the parallel processor, the file input/output command is provided to the kernel on the main processor and is executed. File input/output data may be transmitted from the kernel on the main processor to the lightweight kernel on the parallel processor at high speed with DMA.

That is, in order to perform high-speed input/output in the lightweight kernel, a channel for communicating with the kernel running on the parallel processor is established. By using the channel, input/output that occurs in the lightweight kernel may be offloaded onto the kernel on the parallel processor. Then, the offloaded file input/output enables file data to be transmitted to the memory of the lightweight kernel on the parallel processor through the kernel on the parallel processor and the kernel on the main processor. The DMA scheme may be used in transmission of the file data.

In order to offload file input/output from the lightweight kernel running on the parallel processor onto the kernel (for example, Linux) on the parallel processor, the input/output command of the lightweight kernel is required to be provided to the kernel on the parallel processor. The shared memory between the lightweight kernel on the parallel processor and the kernel on the parallel processor is set and the channel is established on the basis of the shared memory, whereby the input/output command of the lightweight kernel is provided to the kernel on the parallel processor. That is, the physical address of the memory shared between the lightweight kernel on the parallel processor and the kernel on the parallel processor is set, and the set physical address is mapped to virtual addresses of the lightweight kernel and the kernel, thereby serving as the memory shared between the lightweight kernel on the parallel processor and the kernel on the parallel processor. By using the shared memory, the channel for intercommunication between the lightweight kernel on the parallel processor and the kernel on the parallel processor may be established. The channel may be a circular queue-based channel. By using the channel, the input/output command that occurs in the lightweight kernel on the parallel processor may be provided to the kernel on the parallel processor.

In the meantime, in order to perform file input/output, a memory address for inputting/outputting data is required. The file input/output command being provided from the lightweight kernel on the parallel processor to the kernel on the parallel processor may include the physical address of the data of the lightweight kernel on the parallel processor. The lightweight kernel on the parallel processor and the kernel on the parallel processor have their own virtual addresses with respect to a single physical address, because the physical address of the memory is not extracted using the virtual address of the other. In order to use the memory in the kernel on the parallel processor, which corresponds to the physical address received from the lightweight kernel, the kernel on the parallel processor may map the received physical address to the virtual address of the kernel on the parallel processor. The kernel on the parallel processor may configure a new input/output command using the mapped virtual address. Accordingly, through the above process, the kernel on the parallel processor may operate as if the file input/output command were executed on its own memory.

When the kernel on the parallel processor executes the file input/output command, the file input/output command is transmitted to a file system server in which the kernel on the main processor is present through a file system of the kernel on the parallel processor. Here, in order to transmit the file input/output data (or data corresponding to the input/output task) from the kernel on the main processor to the kernel on the parallel processor with DMA, the memory address for inputting/outputting data is required. Therefore, the file input/output command transmitted from the kernel on the parallel processor may include the physical address of the data for file input/output.

The file system server of the kernel on the main processor may extract information on a file corresponding to the received file input/output command from the file system. Furthermore, using the extracted information, the file system server of the kernel on the main processor may transmit file information to be input/output and the physical address of the memory of the parallel processor to a DMA engine. The DMA engine may transmit the file input/output data to the memory of the lightweight kernel on the parallel processor with DMA.

The file system server of the kernel on the main processor may transmit the input/output result (or the result of processing of the input/output task) to the kernel on the parallel processor. The kernel on the parallel processor may transmit the received input/output result to the lightweight kernel on the parallel processor through the channel between the lightweight kernel on the parallel processor and the kernel on the parallel processor.

The kernel on the parallel processor is used as the device driver for file input/output offloading, so that minimum core and memory are used. The remaining cores and memory are used in the lightweight kernel on the parallel processor in operating the application program.

In the present disclosure, the lightweight kernel on the parallel processor may set the shared memory with the kernel on the parallel processor. Also, the lightweight kernel on the parallel processor may establish the channel for transmitting the file input/output command to the kernel on the parallel processor. Also, the lightweight kernel on the parallel processor may extract the physical address of an input/output buffer of the application program in the lightweight kernel on the parallel processor. Also, the lightweight kernel on the parallel processor may transmit the file input/output command to the kernel on the parallel processor. Also, the lightweight kernel on the parallel processor may receive the file input/output result performed in the kernel on the parallel processor and the kernel on the main processor.

In the present disclosure, the kernel on the parallel processor may set the shared memory with the lightweight kernel on the parallel processor. Also, the kernel on the parallel processor may establish the channel for transmitting the file input/output command to the lightweight kernel on the parallel processor. Also, the kernel on the parallel processor may map the entire physical address of the lightweight kernel on the parallel processor to the virtual address of the kernel on the parallel processor. Also, the kernel on the parallel processor may receive the file input/output command transmitted from the lightweight kernel on the parallel processor. Also, the kernel on the parallel processor may convert the physical address of the buffer received from the lightweight kernel on the parallel processor to the virtual address of the kernel on the parallel processor. Also, the kernel on the parallel processor may configure and execute the received file input/output command. Also, the kernel on the parallel processor may transmit the file input/output command to the kernel on the main processor. Also, the kernel on the parallel processor may receive the file input/output result performed in the main processor.

In the present disclosure, the kernel on the main processor may receive the file input/output command transmitted from the kernel on the parallel processor. Also, the kernel on the main processor may perform file input/output. Also, the kernel on the main processor may transmit the file input/output result to the kernel on the parallel processor. Also, the kernel on the main processor may transmit the file input/output data from the physical address of the file to be input/output to physical address of the memory of the parallel processor with a DMA scheme.

Figure 6:
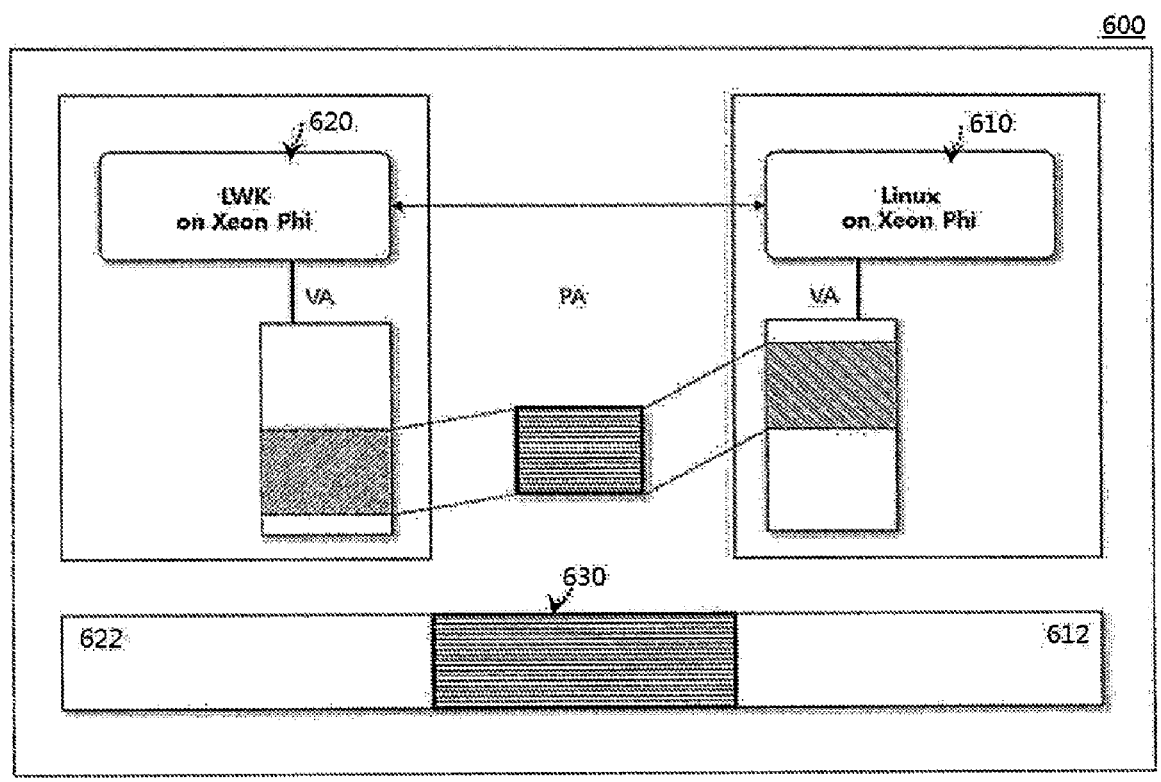
FIG. 6 is a diagram illustrating a process of setting a shared memory between a lightweight kernel on a parallel processor and a kernel on the parallel processor according to an embodiment of the present disclosure.

FIG. 6 is a diagram illustrating a process of setting a shared memory between a lightweight kernel on a parallel processor and a kernel on the parallel processor according to an embodiment of the present disclosure.

Figure 7:
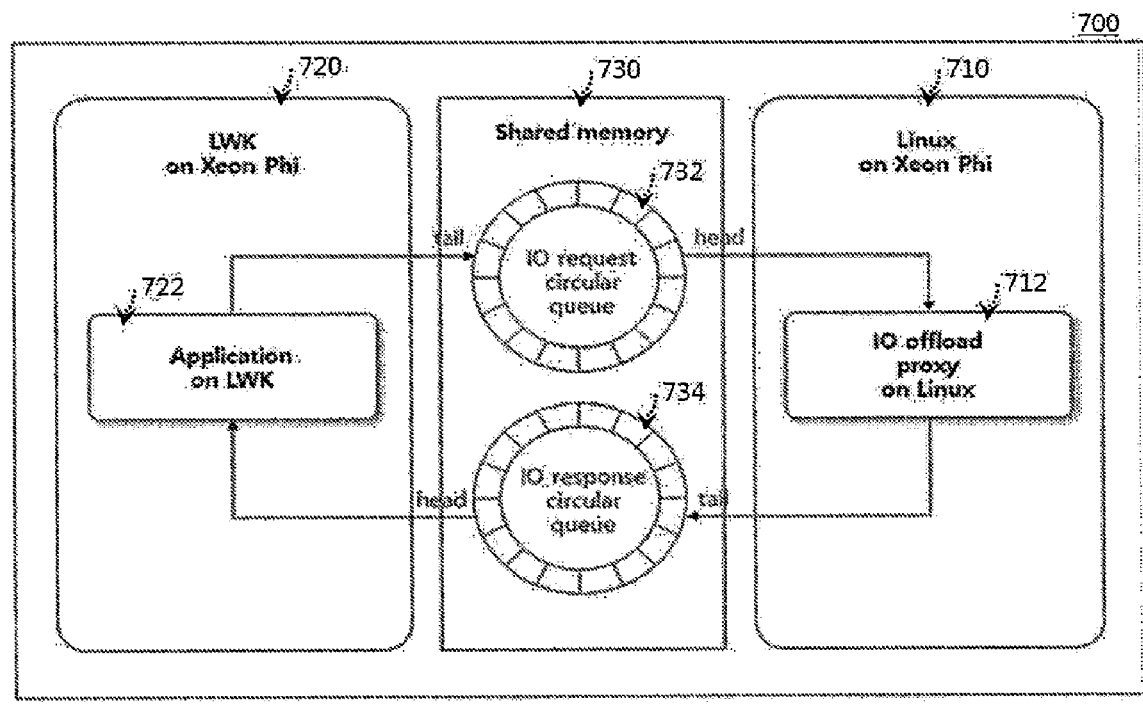
FIG. 7 is a diagram illustrating a process of setting a channel between a lightweight kernel on a parallel processor and a kernel on the parallel processor according to an embodiment of the present disclosure.

FIG. 7 is a diagram illustrating a process of setting a channel between a lightweight kernel on a parallel processor and a kernel on the parallel processor according to an embodiment of the present disclosure.

Referring to FIG. 6, a parallel processor 600 (for example, Xeon Phi) may be equipped with a kernel 610 (for example, Linux) using at least one core and a predetermined area 612 of a memory. Furthermore, the parallel processor 600 may be equipped with a lightweight kernel 620 using the cores excluding the at least one core on which Linux is installed among the cores provided inside and using areas 622 of the memory excluding the predetermined area 612 of the memory on which Linux is installed. Furthermore, a shared memory 630 between the kernel 610 of the parallel processor and the lightweight kernel 620 of the parallel processor may be set.

Referring to FIG. 7, in a shared memory 730 set between a kernel 710 on a parallel processor 700 and a lightweight kernel 720 on the parallel processor 700, an area for processing of the input/output task may be set. Specifically, in the shared memory 730, there is provided a queue in which the lightweight kernel 720 requests the input/output task. For example, included is a file input/output request circular queue 732 for transmitting the input/output command that occurs in an application program 722 of the lightweight kernel 720 to an input/output offload proxy (I/O offload proxy) of the kernel 710. Furthermore, in the shared memory 730, there is provided a queue in which the kernel 710 responds to the result of processing of the input/output task. For example, included is a file input/output response circular queue 734 for transmitting the input/output result performed in the input/output offload proxy 712 of the kernel 710.

Figure 8A:
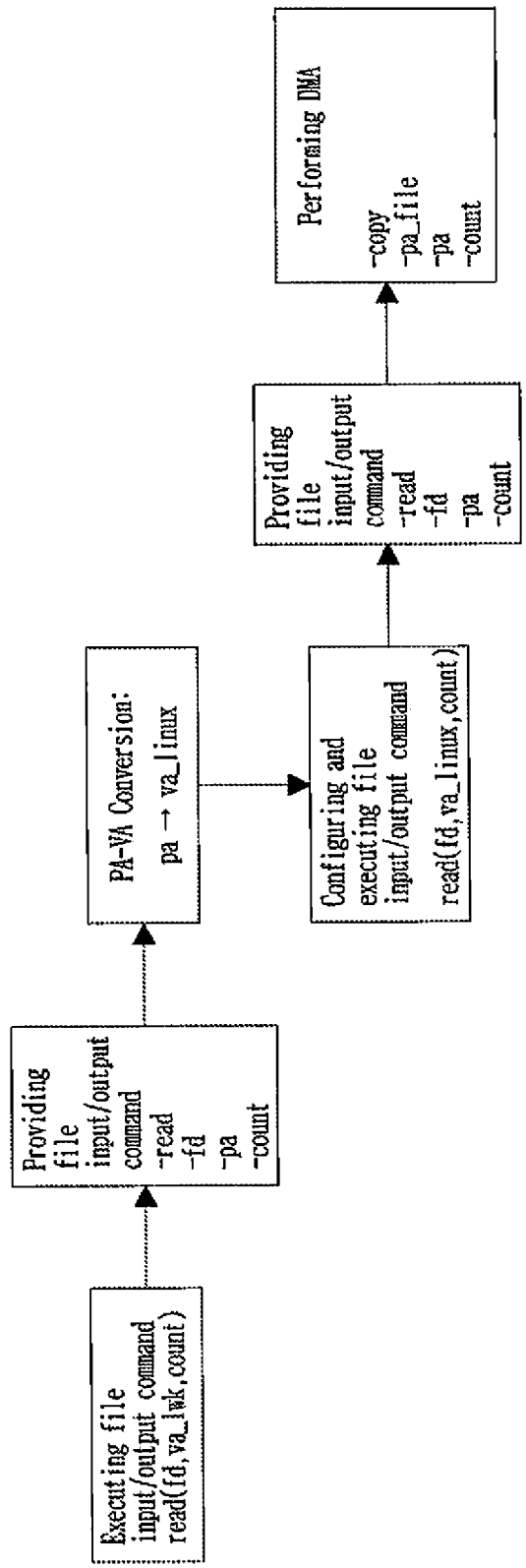
FIGS. 8A and 8B are a flowchart illustrating a process of offloading file input/output from an application program of a lightweight kernel to a kernel on a main processor and to a kernel on a parallel processor according to an embodiment of the present disclosure.
Figure 8B:
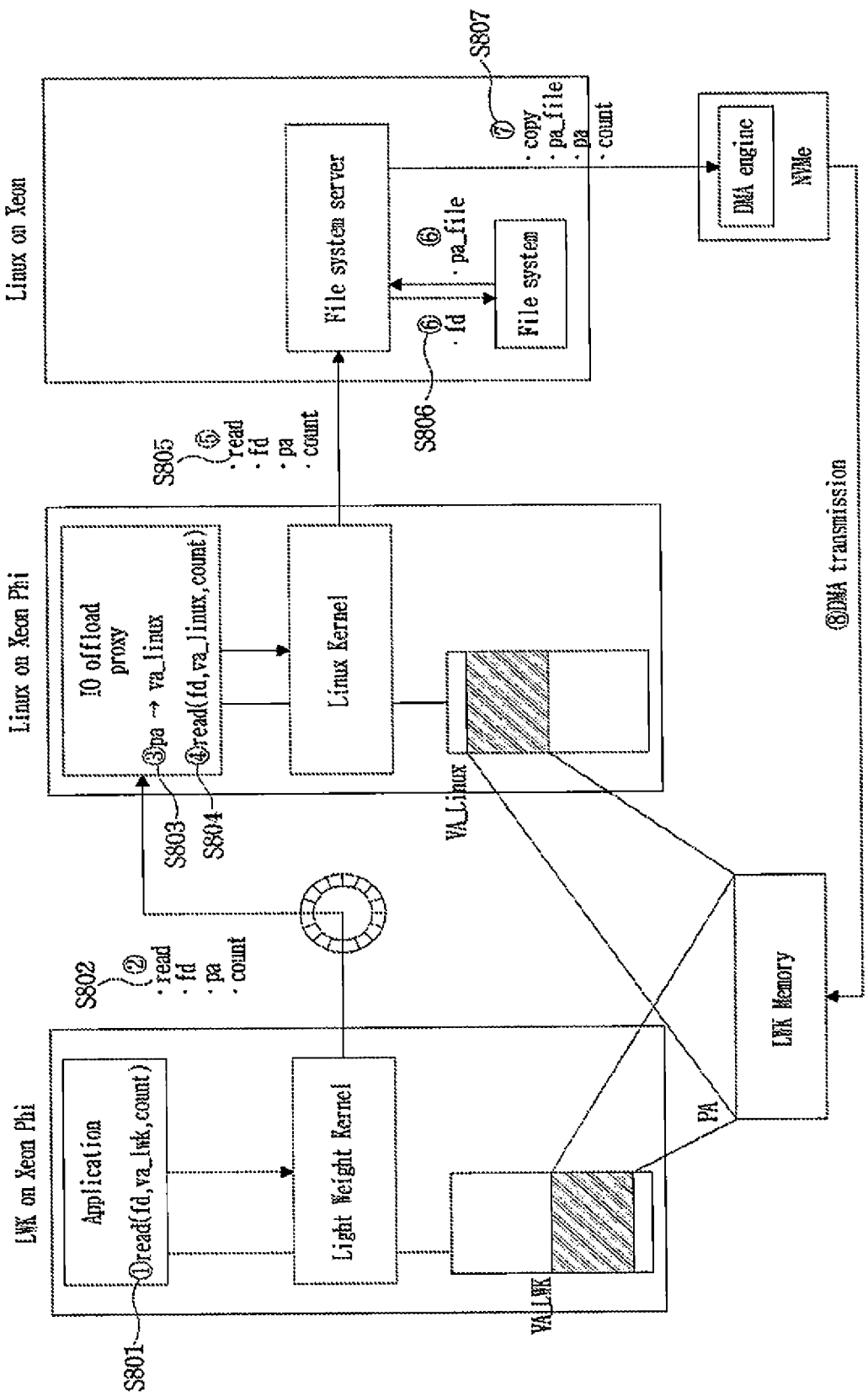

FIGS. 8a and 8b are a flowchart illustrating a process of offloading file input/output from an application program of a lightweight kernel to a kernel on a main processor and to a kernel on a parallel processor according to an embodiment of the present disclosure.

At step S801, the application program of the lightweight kernel may execute the input/output command (for example, read (fd, va_lwk, count)).

At step S802, the lightweight kernel may add the message containing the parameters (for example, fd, pa, count) related to the file input/output command (or parameter related to the input/output task) to the input/output request circular queue, and may transmit the message to the kernel on the parallel processor. Then, the input/output offload proxy on standby in the kernel on the parallel processor may receive the message containing the parameters related to the file input/output command from the input/output request circular queue.

At step S803, the input/output offload proxy of the kernel on the parallel processor may convert the physical address (PA) into the virtual address (VA) (pa→va_linux).

At step S804, the input/output offload proxy of the kernel on the parallel processor may configure the file input/output command (for example, read(fd, va_linx, count)). Furthermore, the input/output offload proxy may execute the configured file input/output command.

At step S805, the kernel on the parallel processor may transmit the message containing the parameters (for example, fd, pa, count) related to the file input/output command to the file system server in the kernel on the main processor.

At step S806, the file system server of the kernel on the main processor may extract information on the file corresponding to the received file input/output command from the file system.

At step S807, the kernel on the main processor may input, to the DMA engine, the physical address of the file to be input/output and the physical address of the memory of the parallel processor.

At step S808, the DMA engine may transmit the file input/output data to the memory of the parallel processor. The DMA scheme may be used in the transmission.

Figure 9A:
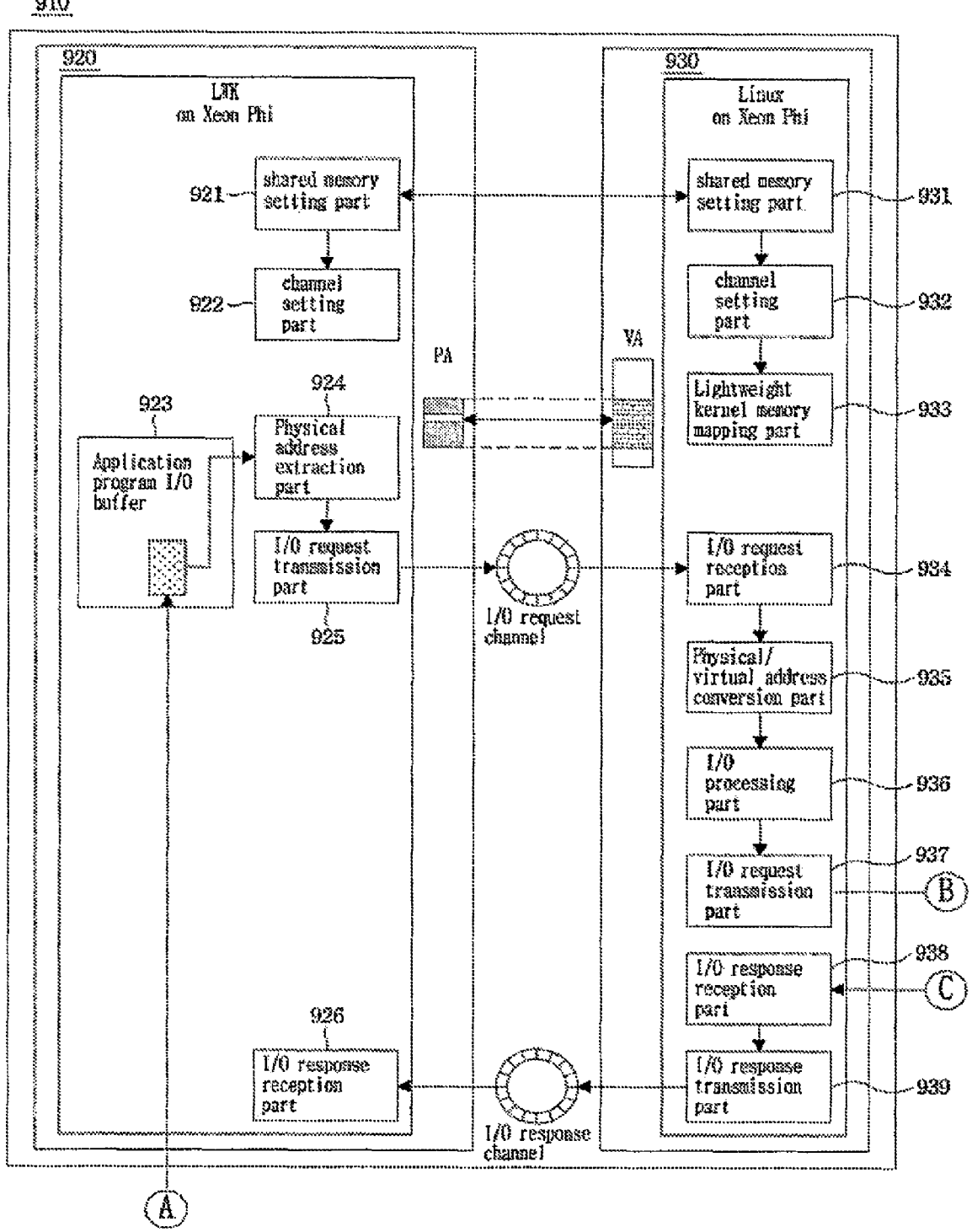
FIGS. 9A, 9B and 9C are a block diagram illustrating a process of offloading file input/output among a lightweight kernel on a parallel processor, a kernel on a main processor, and a kernel on a parallel processor according to an embodiment of the present disclosure.
Figure 9B:
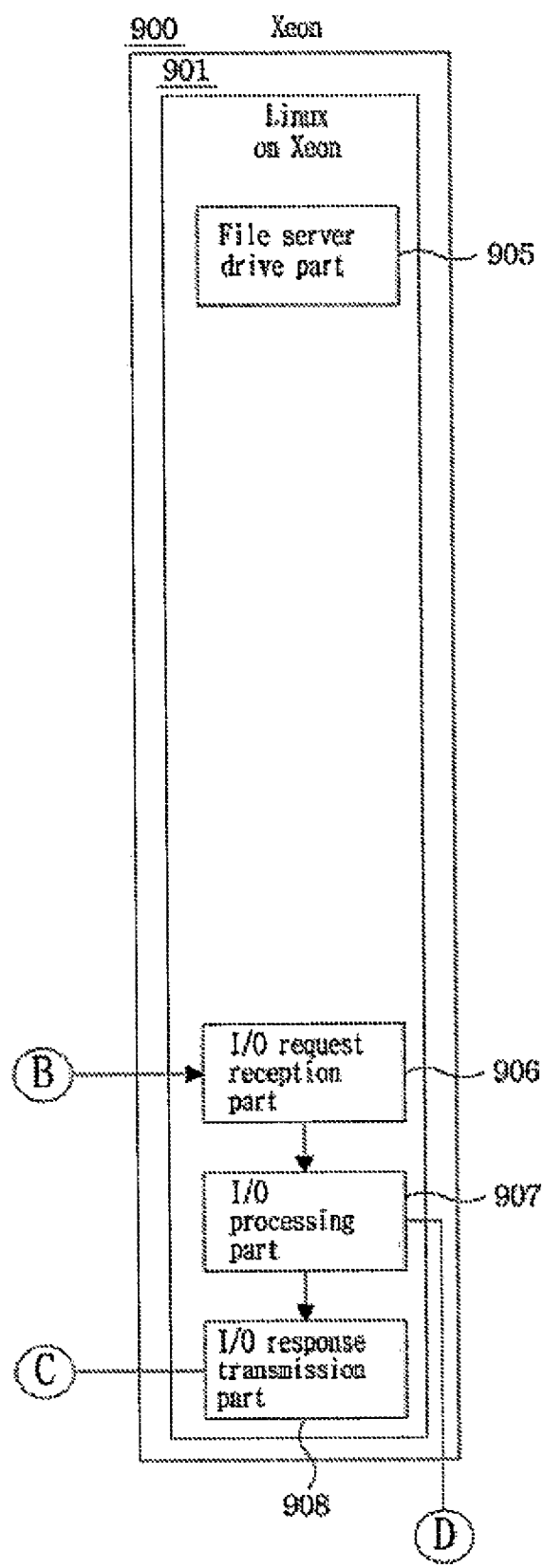
Figure 9C:
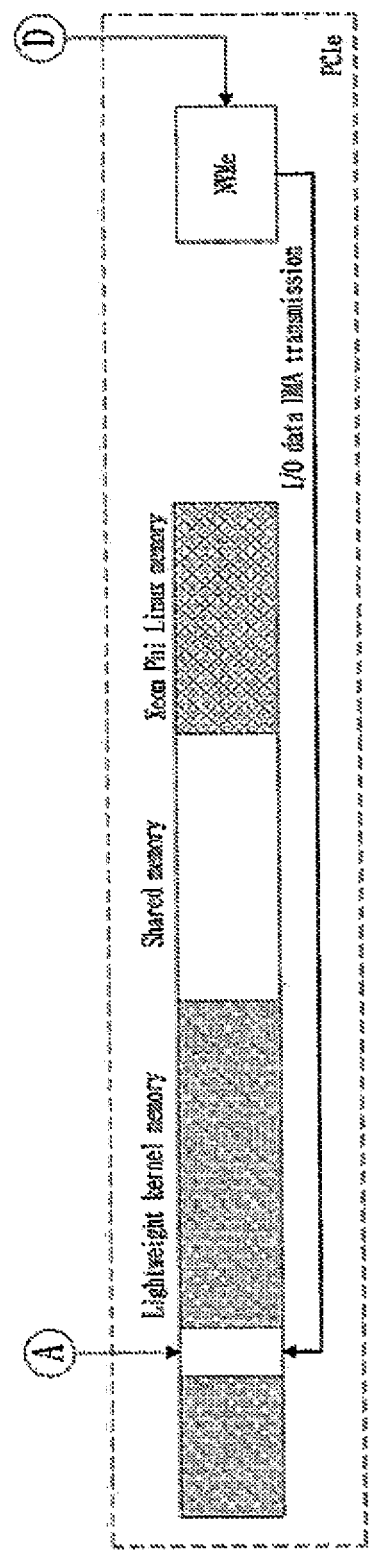

FIGS. 9A, 9B and 9C are a block diagram illustrating a process of offloading file input/output among a lightweight kernel on a parallel processor, a kernel on a main processor, and a kernel on a parallel processor according to an embodiment of the present disclosure.

In the present disclosure, a main processor 900 may include a kernel 901.

The kernel 901 on the main processor 900 may include a file server drive part 905, an input/output request reception part 906, an input/output processing part 907, and/or an input/output response transmission part 908.

In the present disclosure, a parallel processor 910 may include a lightweight kernel 920 or a kernel 930 or both.

The lightweight kernel 920 on the parallel processor 910 may include a shared memory setting part 921, a channel setting part 922, an application program input/output buffer 923, a physical address extraction part 924, an input/output request transmission part 925, and/or an input/output response reception part 926.

The kernel 930 on the parallel processor 910 may include a shared memory setting part 931, a channel setting part 932, a lightweight kernel memory mapping part 933, an input/output request reception part 934, a physical/virtual address conversion part 935, an input/output processing part 936, an input/output request transmission part 937, an input/output response reception part 938, and/or an input/output response transmission part 939.

The shared memory setting part 921 of the lightweight kernel 920 on the parallel processor 910 and the shared memory setting part 931 of the kernel 930 on the parallel processor 910 may set the shared memory between the lightweight kernel 920 and the kernel 930.

The channel setting part 922 of the lightweight kernel 920 on the parallel processor 910 and the setting part 932 of the kernel 930 on the parallel processor 910 may set the channel on the set shared memory. The channel may be a circular queue-based channel.

The lightweight kernel memory mapping part 933 of the kernel 930 on the parallel processor 910 may map the entire memory used by the lightweight kernel 920 on the parallel processor 910 to virtual addresses of the kernel 930 on the parallel processor 910.

The physical address extraction part 924 of the lightweight kernel 920 on the parallel processor 910 may extract the physical address of the application program input/output buffer 923.

The input/output request transmission part 925 of the lightweight kernel 920 on the parallel processor 910 may transmit the message containing the parameters related to the file input/output command to the kernel 930 on the parallel processor 910.

The input/output request reception part 934 of the kernel 930 on the parallel processor 910 may receive the message containing the parameters related to the file input/output command from the input/output request transmission part 925 of the lightweight kernel 920 on the parallel processor 910.

The physical/virtual address conversion part 935 of the kernel 930 on the parallel processor 910 may convert the physical address received to configure the file input/output command into the virtual address of the kernel 930 on the parallel processor 910 by using mapping information generated by the lightweight kernel memory mapping part 933.

The input/output processing part 936 of the kernel 930 on the parallel processor 910 may configure the file input/output command and may execute the file input/output command.

The input/output request transmission part 937 of the kernel 930 on the parallel processor 910 may transmit the message containing the parameters related to the file input/output command to the kernel 901 on the main processor 900.

The input/output request reception part 906 of the kernel 901 on the main processor 900 may receive the message containing the parameters related to the file input/output command from the kernel 930 on the parallel processor 910.

The input/output processing part 907 of the kernel 901 on the main processor 900 may extract file information from the file system. Furthermore, the input/output processing part 907 of the kernel 901 on the main processor 900 may enable the DMA engine to perform DMA transmission on the file.

The input/output response transmission part 908 of the kernel 901 on the main processor 900 may transmit the result of file input/output to the kernel 930 on the parallel processor 910.

The input/output response reception part 938 of the kernel 930 on the parallel processor 910 may receive the result of file input/output from the kernel 901 on the main processor 900.

The input/output response transmission part of the kernel 930 on the parallel processor 910 may transmit the received result of file input/output to the lightweight kernel 920 on the parallel processor 910.

The input/output response reception part 926 of the lightweight kernel 920 on the parallel processor 910 may receive the result of file input/output from the kernel 930 on the parallel processor 910.

Figure 10:
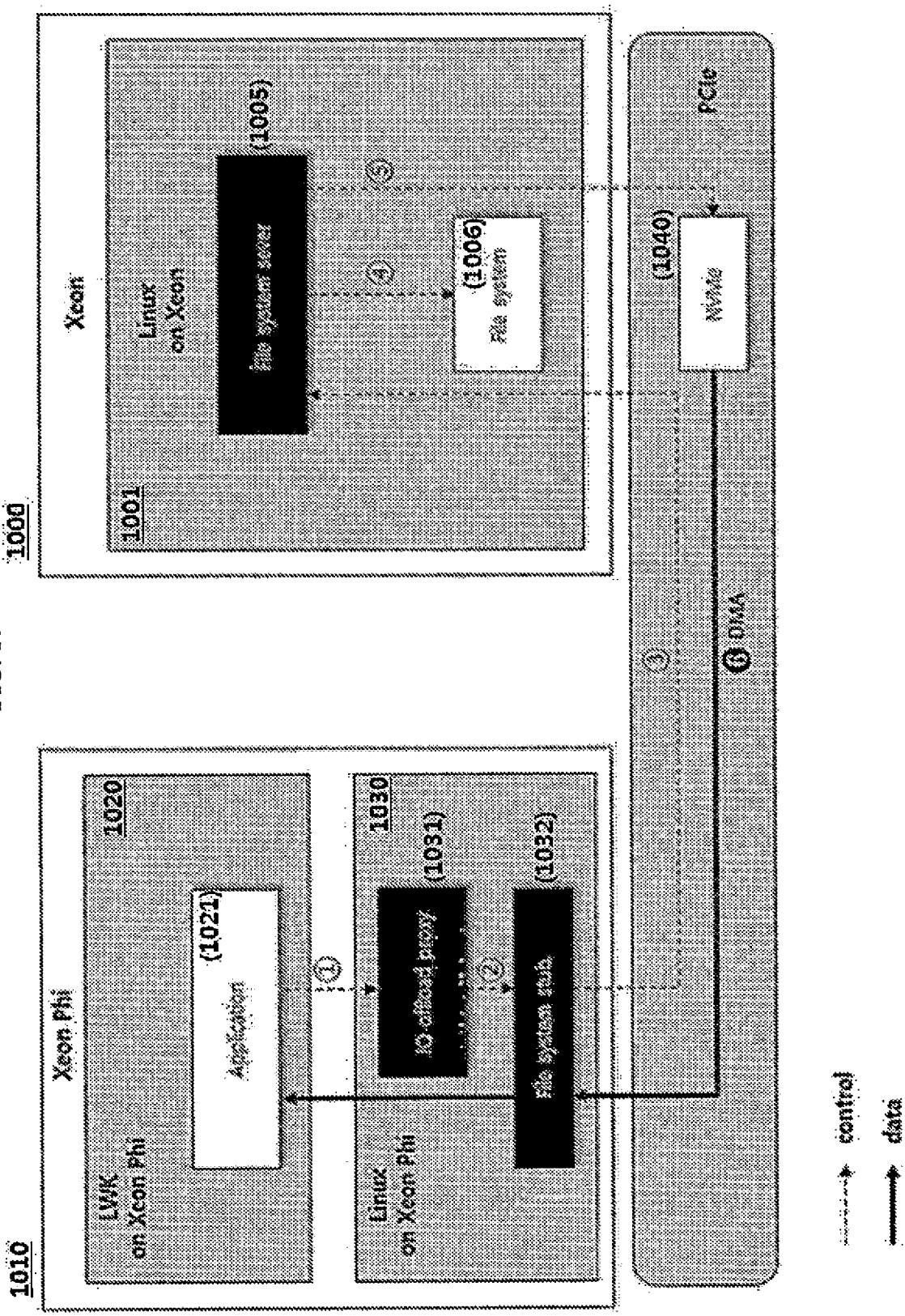
FIG. 10 is a diagram illustrating a system structure for file input/output offloading among a lightweight kernel on a parallel processor, a kernel on a main processor, and a kernel on a parallel processor according to an embodiment of the present disclosure.

FIG. 10 is a diagram illustrating a system structure for file input/output offloading among a lightweight kernel on a parallel processor, a kernel on a main processor, and a kernel on a parallel processor according to an embodiment of the present disclosure.

The system structure in FIG. 10 illustrates a process of performing file input/output offloading among a lightweight kernel 1020 on a parallel processor 1010, a kernel 1001 on a main processor 1000, and a kernel 1030 on a parallel processor.

When an application program 1021 of the lightweight kernel 1020 on the parallel processor 1010 executes the file input/output command, the command is provided to the lightweight kernel 1020. The lightweight kernel 1020 may perform transmission to a file input/output offload proxy 1031 of the kernel 1030 on the parallel processor 1010 through the channel.

The file input/output offload proxy 1031 may convert the physical address into the virtual address and may configure the file input/output command. Furthermore, the file input/output offload proxy 1031 may execute the file input/output command. The executed file input/output command may be transmitted to the kernel 1030 on the parallel processor 1010. Furthermore, a file system stub 1032 may transmit the file input/output command to a file system server 1005 of the kernel 1001 on the main processor 1000.

The file system server 1005 of the kernel 1001 on the main processor 1000 may execute the content of the file input/output command. For example, the file system server 1005 of the kernel 1001 on the main processor 1000 may extract information on the file corresponding to the received file input/output command, from a file system 1006. Furthermore, using the extracted information, the file system server 1005 may transmit information on the file to be input/output and the physical address of the memory of the parallel processor 1010 to a DMA engine 1040.

The DMA engine 1040 may transmit the file input/output data to the memory of the lightweight kernel 1020 on the parallel processor 1010 with DMA. For example, the file system server 1005 of the kernel 1001 on the main processor 1000 and the file system stub 1032 of the kernel 1030 on the parallel processor 1010 may use network file systems, such as a 9P server and a 9P client, respectively. Here, the 9P server and 9P client may be modified in such a manner to perform file input/output offloading among the lightweight kernel 1020, the kernel 1001 on the main processor 1000, and the kernel 1030 on the parallel processor. For example, the 9P server and 9P client may be modified in such a manner that file input/output parameters are transmitted or DMA transmission is possible in the process of file input/output offloading.

In the meantime, in the present disclosure, file input/output offloading among the lightweight kernel on the parallel processor, the kernel on the main processor, and the kernel on the parallel processor may constitute at least one channel on the shared memory. For example, the channel may include the input/output request circular queue or an input/output response queue or both. Also, the number of input/output offload proxies may be one or more. By using multiple channels or multiple input/output offload proxies or all, an operation optimized for a target application program may be provided.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-execut-

What is claimed is:

1. A method of processing input and output in a multi-kernel system, the method comprising:
    setting a shared memory between a first kernel on a main processor and a lightweight kernel on a parallel processor;
    setting a data transmission and reception channel between the first kernel on the main processor and the lightweight kernel on the parallel processor using the shared memory;
    providing, on the basis of the data transmission and reception channel, an input/output task that occurs in the lightweight kernel to the first kernel on the main processor;
    processing, by the first kernel on the main processor, an operation corresponding to the input/output task; and
    providing a result of the processing to the lightweight kernel,
    wherein setting the shared memory comprises setting the shared memory between the first kernel on the main processor and a second kernel on the parallel processor, and the first kernel and the second kernel include respective operating system based kernels, and
    wherein setting of the shared memory comprises:
        checking, by the second kernel on the parallel processor, a physical address of the shared memory;
        providing, by the second kernel on the parallel processor, the physical address of the shared memory to the lightweight kernel; and
        setting, by the lightweight kernel, a virtual address corresponding to the physical address.

2. The method of claim 1, wherein the setting of the data transmission and reception channel comprises:
    setting, by the lightweight kernel on the parallel processor and the first kernel on the main processor, an input/output request queue in the shared memory; and
    setting, by the lightweight kernel on the parallel processor and the first kernel on the main processor, an input/output response queue in the shared memory.

3. The method of claim 2, wherein the providing of the input/output task that occurs in the lightweight kernel to the first kernel comprises:
    loading parameters related to the input/output task into the input/output request queue.

4. The method of claim 2, wherein the providing of the result of the processing to the lightweight kernel comprises:
    loading data corresponding to the result of the processing into the input/output response queue.

5. The method of claim 3, wherein the parameters related to the input/output task comprises at least one among a file identifier, a file type, a file path, and a file descriptor.

6. The method of claim 1, wherein the first kernel on the main processor and a second kernel on the parallel processor are the same kernel.

7. The method of claim 2, wherein the input/output request queue and the input/output response queue are set using information that a physical address of the shared memory is mapped to a virtual address.

8. The method of claim 3, wherein the loading of the parameters related to the input/output task into the input/output request queue comprises:
    checking a virtual address corresponding to the input/output request queue; and
    loading the parameters related to the input/output task into the virtual address corresponding to the input/output request queue.

9. The method of claim 4, wherein the loading of the data corresponding to the result of the processing into the input/output response queue comprises:
    checking a virtual address corresponding to the input/output response queue; and
    loading the data corresponding to the result of the processing into the virtual address corresponding to the input/output response queue.

10. The method of claim 4, wherein the providing of the result of the processing to the lightweight kernel further comprises:
    checking, by the lightweight kernel, the data corresponding to the result of the processing, which is loaded into the input/output response queue.

11. The method of claim 2,
    wherein the input/output request queue is a multi-entry input/output request circular queue, and
    wherein the input/output response queue is a multi-entry input/output response circular queue.

* * * * *